United States Patent
Lan

(12) United States Patent (10) Patent No.: US 7,072,120 B2
Lan (45) Date of Patent: Jul. 4, 2006

(54) IMAGE PICK-UP APPARATUS WITH CURVATURE-OF-FIELD CORRECTION

(75) Inventor: Zhi-Qiang Lan, Dong-Guan (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/017,713

(22) Filed: Dec. 22, 2004

(65) Prior Publication Data
US 2006/0056040 A1    Mar. 16, 2006

(30) Foreign Application Priority Data
Sep. 2, 2004    (TW) .............................. 93126490 A

(51) Int. Cl.
G02B 3/00    (2006.01)
(52) U.S. Cl. .................................................. 359/664
(58) Field of Classification Search ................ 359/664, 359/808, 821, 648; 348/360
See application file for complete search history.

(56) References Cited

U.S. PATENT DOCUMENTS 4,467,361 A    8/1984 Ohno et al. .................. 348/340
5,103,749 A *    4/1992 Geisselmann et al. . 112/475.03
2004/0227845 A1 *    11/2004 Kawai .......................... 348/360

\* cited by examiner

*Primary Examiner*—Timothy Thompson
*Assistant Examiner*—Jerry Fang
(74) *Attorney, Agent, or Firm*—Pillsbury Winthrop Shaw Pittman, LLP

(57) ABSTRACT

An image pick-up apparatus includes an object lens, an image transmission device, and an image-sensing device. The object lens projects an image of an object to be picked-up. The image transmission device has an image-receiving side disposed to receive the image projected by the object lens, an image output side, and an image-transmitting portion coupled optically with the image-receiving side and the image output side. The image-receiving side has a curvature corresponding to curvature-of-field characteristics of the object lens so as to enable correction of aberrations introduced by the object lens into the image projected by the object lens. The image-sensing device is coupled optically with the image output side of the image transmission device for sensing a corrected image of the object to be picked-up that is provided by the image transmission device at the image output side.

5 Claims, 4 Drawing Sheets

IMAGE PICK-UP APPARATUS WITH CURVATURE-OF-FIELD CORRECTION

CROSS-REFERENCE TO RELATED APPLICATION

This application claims priority of Taiwanese application no. 093126490, filed on Sep. 2, 2004.

BACKGROUND OF THE INVENTION

1. Field of the Invention

The invention relates to an image pick-up apparatus, more particularly to an image pick-up apparatus that can correct aberrations attributed to curvature-of-field characteristics of an object lens thereof.

2. Description of the Related Art

Referring to FIG. 1, a conventional image pick-up apparatus 1 found in digital still cameras or video cameras including an object lens 11 and an image-sensing device 12 is shown. The object lens 11 includes at least one lens element with a predetermined curvature and serves to project an image 111 of an object 100 to be picked-up. The image-sensing device 12 has a planar image-receiving side 121 disposed to receive the image 111 projected by the object lens 11, and includes an image-sensing unit 122. In general, the image-sensing device 12 is either a charge-coupled device (CCD) or a complementary metal oxide semiconductor (CMOS) sensor.

In view of curvature-of-field characteristics of the object lens 11, the object lens 11 introduces aberrations and distortions into the image 111 that is projected to the planar image-receiving side 121 of the image-sensing device 12. As a result, during focus adjustment, the image output of the apparatus 1 may exhibit a clear central part with slightly blurred edge parts, or clear edge parts with a slightly blurred central part.

While it is possible to modify the construction of the object lens to minimize aberrations and distortions in the image projected thereby, the modified object lens would be bulky and thus unsuitable for portable applications.

FIG. 2 illustrates an image pick-up apparatus according to U.S. Pat. No. 4,467,361. In the apparatus of FIG. 2, the image receiving side 121' of the image-sensing device 12' is formed with a predetermined curvature to match the curvature-of-field characteristics of the object lens 11'. As a result, aberrations and distortions introduced by the object lens 11' into the image 111' can be corrected accordingly. However, fabrication of the curved image receiving side 121' of the image-sensing device 12' that matches the curvature-of-field characteristics of the object lens 11' is difficult and costly to be implemented.

SUMMARY OF THE INVENTION

Therefore, the object of the present invention is to provide an image pick-up apparatus that can overcome the above drawbacks associated with the aforementioned prior art.

According to one aspect of the present invention, there is provided an image pick-up apparatus that comprises an object lens, an image transmission device, and an image-sensing device. The object lens projects an image of an object to be picked-up. The image transmission device has an image-receiving side disposed to receive the image projected by the object lens, an image output side, and an image-transmitting portion coupled optically with the image-receiving side and the image output side. The image-receiving side has a curvature corresponding to curvature-of-field characteristics of the object lens so as to enable correction of aberrations introduced by the object lens into the image projected by the object lens. The image-sensing device is coupled optically with the image output side of the image transmission device for sensing a corrected image of the object to be picked-up that is provided by the image transmission device at the image output side.

According to another aspect of the present invention, there is provided an image transmission device for use in an image pick-up apparatus that includes an object lens and an image-sensing device. The object lens projects an image of an object to be picked-up. The image transmission device is adapted to be disposed between the object lens and the image-sensing device, and is adapted to correct aberrations introduced by the object lens as a result of curvature-of-field characteristics of the object lens into the image projected by the object lens. The image-sensing device senses a corrected image of the object to be picked-up from the image transmission device. The image transmission device comprises an image-receiving side, an image output side and an image-transmitting portion. The image-receiving side is adapted for receiving the image projected by the object lens, and has a curvature corresponding to the curvature-of-field characteristics of the object lens so as to enable correction of the aberrations introduced by the object lens into the image projected by the object lens. The image output side is adapted for coupling optically with the image-sensing device and for providing the corrected image to the image-sensing device. The image-transmitting portion is coupled optically with the image-receiving side and the image output side.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
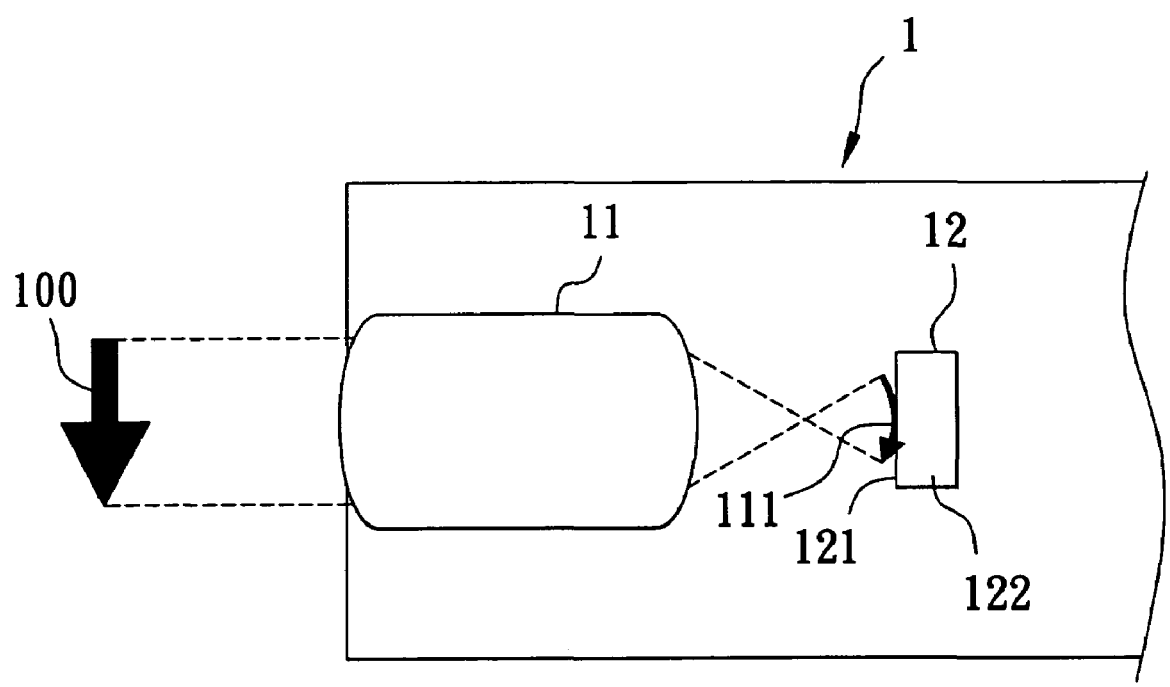
FIG. 1 is a schematic diagram of a conventional image pick-up apparatus.
Figure 2:
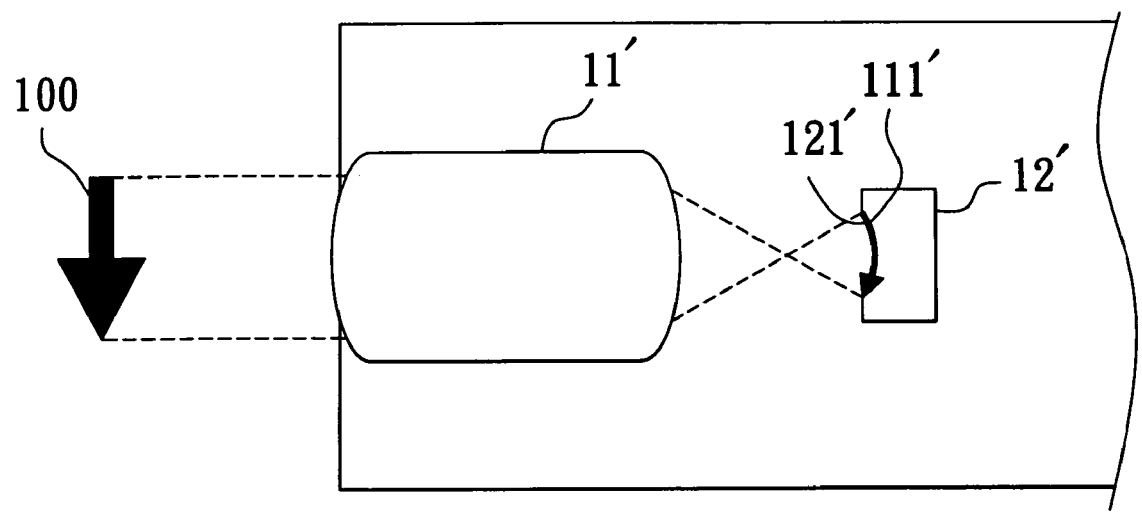
FIG. 2 is a schematic diagram of another conventional image pick-up apparatus.
Figure 3:
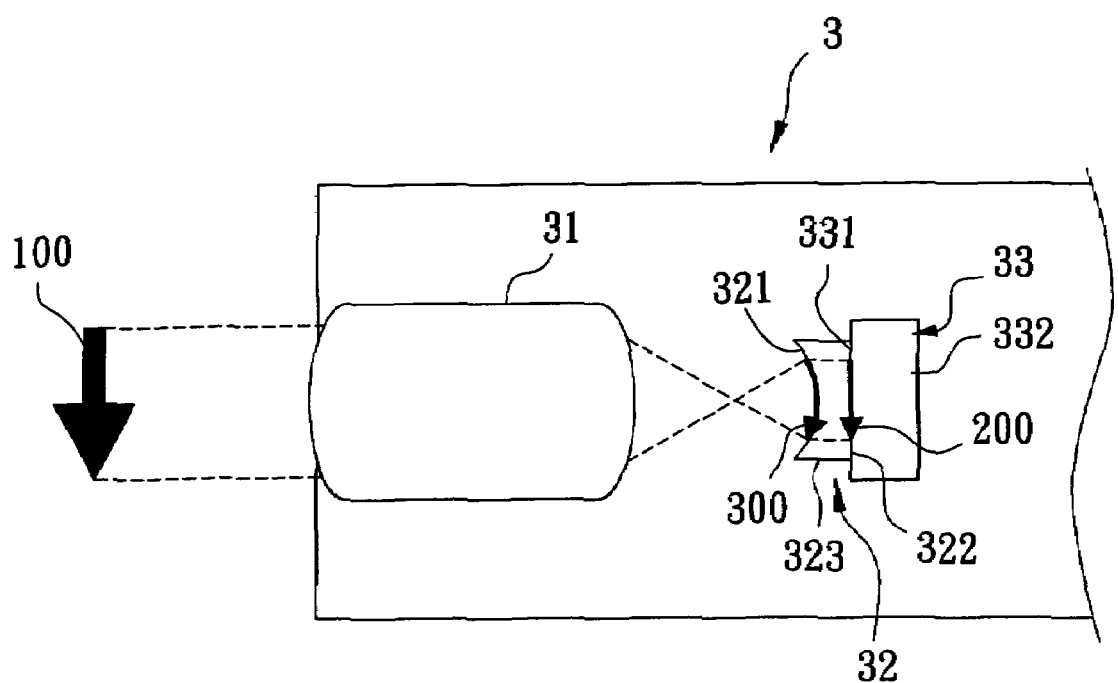
FIG. 3 is a schematic diagram of the preferred embodiment of an image pick-up apparatus with curvature-of-field correction according to the present invention.

Referring to FIG. 3, the preferred embodiment of an image pick-up apparatus 3 with curvature-of-field correction according to the present invention is suitable for application to optical devices, such as digital still cameras and video cameras. The image pick-up apparatus 3 comprises an object lens 31, an image transmission device 32, and an image-sensing device 33.

The object lens 31, which is formed from one or more lens elements in a conventional manner, serves to project an image 300 of the object 100 to be picked-up.

The image transmission device 32 has an image-receiving side 321 disposed to receive the image 300 projected by the object lens 31, an image output side 322, and an image-transmitting portion 323 coupled optically with the image-receiving side 321 and the image output side 322. The image-receiving side 321 has a curvature corresponding to curvature-of-field characteristics of the object lens 31 so as to enable correction of aberrations introduced by the object lens 31 into the image 300 projected by the object lens 31. It is noted that the curvature-of-field characteristics vary among different object lenses, and may have a constant or variable radius of curvature.

Figure 4:
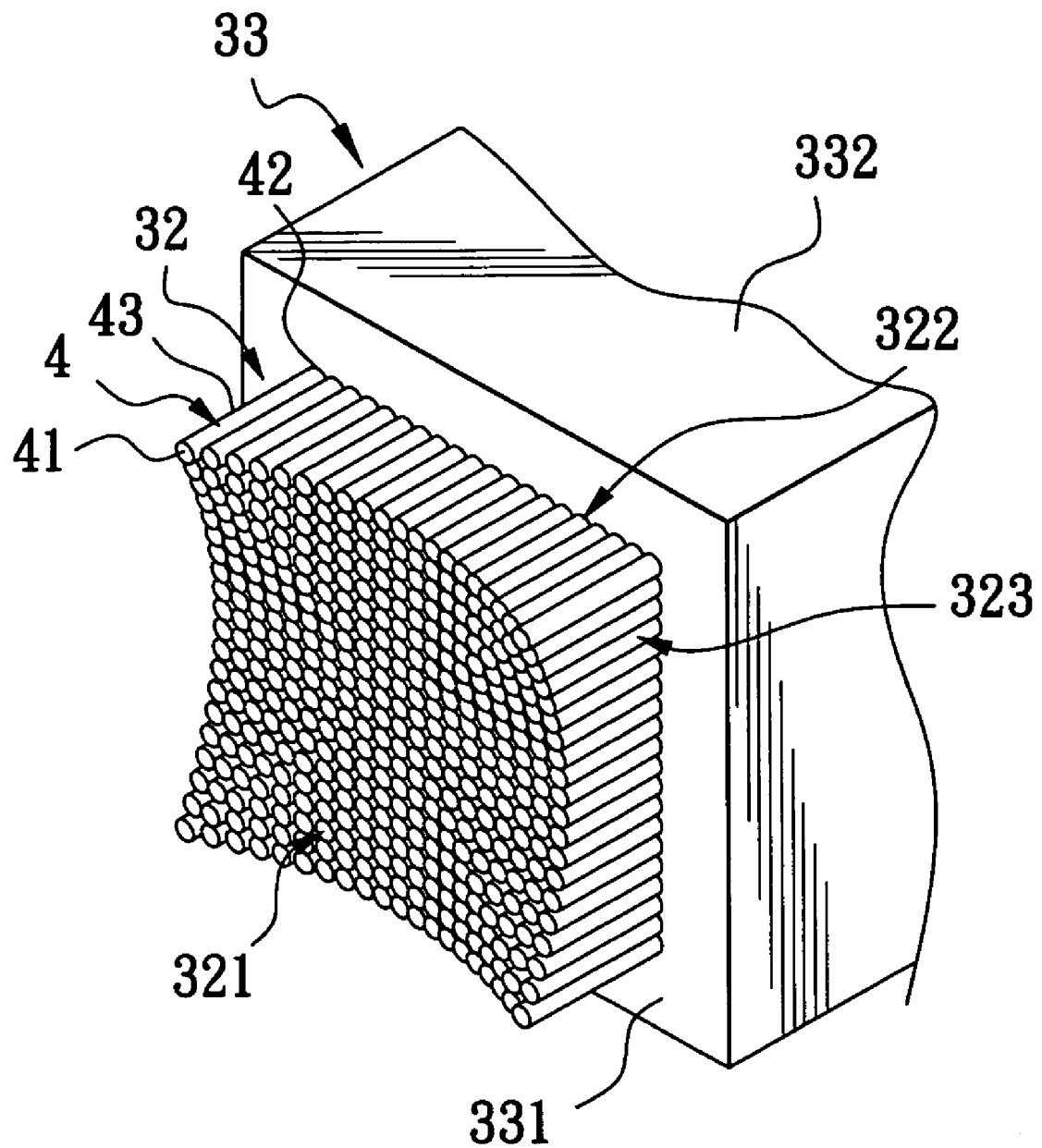
FIG. 4 is a fragmentary perspective view of the preferred embodiment.

Referring to FIG. 4, the image transmission device 32 comprises a bundle of light guide components 4, which are optical fibers in this embodiment. Each of the light guide components 4 has opposite first and second ends 41, 42 and a wall section 43 that extends between the first and second ends 41, 42. The first ends 41 of the light guide components 4 are contoured such that the first ends 41 of the light guide components 4 cooperate to form the image-receiving side 321 of the image transmission device 32. That is, the first ends 41 of the light guide components 4 are cut so as to match the curvature-of-field characteristics of the particular object lens 31 that is in use. The second ends 42 of the light guide components 4 cooperate to form the image output side 322 of the image transmission device 32. The wall sections 43 of the light guide components 4 cooperate to form the image-transmitting portion 323 of the image transmission device 32.

While the light guide components 4 are exemplified using optical fibers, it is apparent to those skilled in the art that other optical components having a similar light guiding function, such as light pipes, are also applicable for use in making the image transmission device 32.

The image-sensing device 33 has a planar image-receiving side 331 coupled optically with the image output side 322 of the image transmission device 32 for receiving a corrected planar image 200 of the object 100 to be picked-up. In particular, the projected image 300 received at the curved image-receiving side 321 is transmitted to the image output side 322 via the image-transmitting portion 323 to result in the corrected planar image 200 that is provided to the image-receiving side 331. The image-sensing device 33 includes an image-sensing unit 332 for sensing the corrected planar image 200. The image-sensing unit 332, which is conventional in construction, includes a charge-coupled device (CCD) or a complementary metal oxide semiconductor (CMOS) sensor, and is operable so as to generate an electrical output corresponding to the corrected planar image 200 sensed thereby for further processing, such as storage or transmission for subsequent use.

In use, because the image-receiving side 321 of the image transmission device 32 is formed to match the curvature-of-field characteristics of the object lens 31, the projected image 300 of the object 100 to be picked-up at the image-receiving side 321 will be clear. In addition, because the image output side 322 is coupled optically with the image-receiving side 321 via the image-transmitting portion 323, the corrected planar image 200 corresponding to the projected image 300 and provided at the image output side 322 of the image transmission device 32 for sensing by the image-sensing device 33 will also be clear.

In sum, this invention provides an image pick-up apparatus 3 that includes an object lens 31 for projecting an image 300 of an object 100 to be picked-up, an image-sensing device 33, and an image transmission device 32 disposed between the object lens 31 and the image-sensing device 33 for correcting aberrations introduced by the object lens 31 as a result of curvature-of-field characteristics (e.g., a constant or variable radius of curvature) of the object lens 31 into the image 300 projected by the object lens 31. The image transmission device 32, which is preferably in the form of a bundle of light guide components 4, includes an image-receiving side 321 to receive the image 300 projected by the object lens 31 and formed with a curvature corresponding to the curvature-of-field characteristics of the object lens 31 so as to enable correction of the aberrations introduced by the object lens 31 into the image 300. The image transmission device 32 further includes an image output side 322 for coupling optically with the image-sensing device 33 and for providing a corrected image 200 to the image-sensing device 33, and an image-transmitting portion 323 coupled optically with the image-receiving side 321 and the image output side 322. As a result, the image-sensing device 33 senses the corrected image 200 of the object 100 to be picked-up from the image transmission device 32. The object of curvature-of-field correction through a simple yet cost-effective manner is thus achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An image pick-up apparatus comprising:

an object lens for projecting an image of an object to be picked-up;

an image transmission device having an image-receiving side disposed to receive the image projected by said object lens, an image output side, and an image-transmitting portion coupled optically with said image-receiving side and said image output side, said image-receiving side having a curvature corresponding to curvature-of-field characteristics of said object lens so as to enable correction of aberrations introduced by said object lens into the image projected by said object lens, said image transmission device including a bundle of light guide components, each of which is an optical fiber, and has opposite first and second ends and a wall section that extends between said first and second ends, said first ends of said light guide components being contoured such that said first ends of said light guide components cooperate to form said image-receiving side of said image transmission device, said second ends of said light guide components cooperating to form said image output side of said image transmission device, said wall sections of said light guide components cooperating to form said image-transmitting portion of said image transmission device; and an image-sensing device coupled optically with said image output side of said image transmission device for sensing a corrected image of the object to be picked-up that is provided by said image transmission device at said image output side.

2. The image pick-up apparatus as claimed in claim 1, wherein said image-sensing device is operable so as to generate an electrical output corresponding to the corrected image sensed thereby.

3. The image pick-up apparatus as claimed in claim 2, wherein said image-sensing device includes a charge-coupled device.

4. The image pick-up apparatus as claimed in claim 2, wherein said image-sensing device includes a complementary metal oxide semiconductor (CMOS) sensor.

5. An image transmission device for use in an image pick-up apparatus that includes an object lens and an image-sensing device, the object lens projecting an image of an object to be picked-up, said image transmission device being adapted to be disposed between the object lens and the image-sensing device and being adapted to correct aberrations introduced by the object lens as a result of curvature-of-field characteristics of the object lens into the image projected by the object lens, the image-sensing device sensing a corrected image of the object to be picked-up from said image transmission device, said image transmission device comprising:

a bundle of light guide components, each of which is an optical fiber, and has opposite first and second ends and a wall section that extends between said first and second ends;

said first ends of said light guide components being contoured such that said first ends of said light guide components cooperate to form an image-receiving side of said image transmission device;

said second ends of said light guide components cooperating to form an image output side of said image transmission device;

said wall sections of said light guide components cooperating to form an image-transmitting portion of said image transmission device;

said image-receiving side being adapted for receiving the image projected by the object lens, and having a curvature corresponding to the curvature-of-field characteristics of the object lens so as to enable correction of the aberrations introduced by the object lens into the image projected by the object lens;

said image output side being adapted for coupling optically with the image-sensing device and for providing the corrected image to the image-sensing device;

said image-transmitting portion being coupled optically with said image-receiving side and said image output side.

* * * * *